United States Patent
Kolmanovsky et al.

[11] Patent Number: 6,035,639
[45] Date of Patent: Mar. 14, 2000

[54] METHOD OF ESTIMATING MASS AIRFLOW IN TURBOCHARGED ENGINES HAVING EXHAUST GAS RECIRCULATION

[75] Inventors: Ilya V. Kolmanovsky, Ypsilanti; Mrdjan J. Jankovic, Birmingham; Michiel J. Van Nieuwstadt, Ann Arbor, all of Mich.; Paul Eduard Moraal, Wuerselen, Germany

[73] Assignee: Ford Global Technologies, Inc., Dearborn, Mich.

[21] Appl. No.: 09/236,991

[22] Filed: Jan. 26, 1999

[51] Int. Cl.[7] .......................... F02M 25/07; F02B 33/44; F02B 47/08
[52] U.S. Cl. ........................................................ 60/605.2
[58] Field of Search .................... 60/602, 605.2, 60/606, 607, 608; 701/108

[56] References Cited

U.S. PATENT DOCUMENTS

| | | | |
|---|---|---|---|
| 4,477,875 | 10/1984 | Suzuki et al. | 701/111 |
| 4,727,848 | 3/1988 | Stumpp et al. | 123/568.28 |
| 5,123,246 | 6/1992 | Younessi | 60/602 |
| 5,228,292 | 7/1993 | Hanauer | 60/602 |
| 5,273,019 | 12/1993 | Matthews | 123/406.48 |
| 5,333,456 | 8/1994 | Bollinger | 60/605.2 |
| 5,505,174 | 4/1996 | Komoriya | 123/406.48 |
| 5,520,161 | 5/1996 | Klopp | 123/676 |
| 5,601,068 | 2/1997 | Nozaki | 123/676 |
| 5,738,126 | 4/1998 | Fausten | 123/568.21 |
| 5,778,674 | 7/1998 | Kimura | 60/600 |
| 5,867,986 | 2/1999 | Buratti et al. | 60/602 |

FOREIGN PATENT DOCUMENTS 0 774 574 A1  5/1997  European Pat. Off. .

*Primary Examiner*—Tony M. Argenbright
*Assistant Examiner*—Arnold Castro
*Attorney, Agent, or Firm*—Jerome R. Drouillard; Allan J. Lippa

[57] ABSTRACT

A method of estimating the airflow into a compression ignition engine having an exhaust gas recirculation system (EGR) and a variable geometry turbocharger (VGT). The method includes the steps of generating an EGR flow value as a function of the intake manifold pressure (MAP), exhaust manifold pressure (EXMP), position of the exhaust gas recirculation valve, and temperature of the gas flowing through the EGR. From this calculation, the method generates an intake airflow value (MAF) as a function of the EGR flow value and the intake aircharge temperature. The intake airflow value is used, in turn, to control the position of the EGR valve. The disclosed method thereby eliminates the necessity for a MAF sensor.

17 Claims, 2 Drawing Sheets

METHOD OF ESTIMATING MASS AIRFLOW IN TURBOCHARGED ENGINES HAVING EXHAUST GAS RECIRCULATION

TECHNICAL FIELD

This invention relates to turbocharged compression ignition engines having exhaust gas recirculation systems and, more particularly, to methods of estimating the mass air flow into diesel engines equipped with variable geometry turbochargers (VGT) and exhaust gas recirculation (EGR) systems.

BACKGROUND OF THE INVENTION

High performance, high speed diesel engines are often equipped with turbochargers to increase power density over a wider engine operating range, and EGR systems to reduce the production of NOx emissions.

Turbochargers use a portion of the exhaust gas energy to increase the mass of the air charge delivered to the engine combustion chambers. The larger mass of air can be burned with a larger quantity of fuel, thereby resulting in increased power and torque as compared to naturally aspirated engines.

A typical turbocharger consists of a compressor and turbine coupled by a common shaft. The exhaust gas drives the turbine which drives the compressor which, in turn, compresses ambient air and directs it into the intake manifold. Variable geometry turbochargers (VGT) allow the intake airflow to be optimized over a range of engine speeds. This is accomplished by changing the angle of the inlet guide vanes on the turbine stator. An optimal position for the inlet guide vanes is determined from a combination of desired torque response, fuel economy, and emissions requirements.

EGR systems are used to reduce NOx emissions by increasing the dilution fraction in the intake manifold. EGR is typically accomplished with an EGR valve that connects the intake manifold and the exhaust manifold. In the cylinders, the recirculated exhaust gas acts as an inert gas, thus lowering the flame and in-cylinder gas temperature and, hence, decreasing the formation of NOx. On the other hand, the recirculated exhaust gas displaces fresh air and reduces the air-to-fuel ratio of the in-cylinder mixture.

Both the VGT and EGR regulate gas flow from the exhaust manifold, and their effect is, therefore, coupled through the conditions in the exhaust manifold. Excessive EGR rates displace the intake of fresh air and may lead to incomplete combustion of the injected fuel which, in turn, could cause visible levels of smoke and increased levels of emissions. Moreover, this could negatively affect fuel economy and/or performance. Thus, for effective control of diesel engines with EGR systems, it is necessary to control the EGR flow precisely, not only in steady state but also in transient conditions. In the case of diesel engines equipped with a VGT, the actual flow through the EGR valve can vary greatly, even for a fixed EGR valve opening, depending upon the exhaust pressure fluctuations generated by opening or closing the inlet guide vanes of the VGT. In such a case, it is difficult to control the EGR flow based solely on EGR valve position.

Accordingly, current engine designs utilize a mass airflow (MAF) sensor and a manifold absolute pressure (MAP) sensor for proper regulation of airflow into the engine and, consequently, EGR flow in VGT-equipped engines. Regulation of airflow is important because it directly relates to the amount of fuel that can be injected to meet driver demand, while avoiding visible smoke and excessive particulate emissions.

Set points for MAP and MAF are developed by engine mapping which is referenced to fuel demand as well as and engine speed. The EGR valve is used to control MAF, and the VGT is used to control MAP. Neither EGR flow nor VGT position is typically measured. Conventional MAF sensors, however, have limited accuracy and are more expensive than MAP sensors or exhaust manifold pressure (EXMP) sensors.

DISCLOSURE OF THE INVENTION

One object of the present invention is to estimate the compressor mass airflow (MAF) based on MAP and EXMP and EGR valve position rather than a MAF sensor.

Another object is to improve EGR control by providing an accurate estimate of MAF.

The invention is advantageous in that it reduces system costs by taking advantage of an EXMP sensor as a replacement for the more expensive conventional MAF sensor.

According to the present invention, the foregoing and other objects and advantages are obtained by a method of calculating the airflow into the compressor of a turbocharged compression ignition engine having an EGR system. The method comprises the steps of generating MAP and EXMP values, determining the position of the EGR valve, and determining the exhaust gas temperature and the intake aircharge temperature. From these measured or estimated values, the EGR flow is calculated as a function of MAP and EXMP, the exhaust gas temperature value, and the position of the EGR valve. Once the EGR flow value is obtained, the compressor air flow value, i.e., MAF, is determined dynamically as a function of the EGR flow value, the intake aircharge temperature value, and dynamic estimator state. The compressor flow value is then used to control the position of the EGR valve.

In accordance with another aspect of the invention, the compression ignition engine system comprises an engine block housing combustion chambers for combusting an air/fuel mixture. The engine block is connected to an intake and exhaust manifold for delivering air into the combustion chambers and exhausting gas out of the combustion chambers, respectively. A turbocharger includes a turbine driven by the exhaust gas in the exhaust manifold. The turbine, in turn, drives a compressor to increase the flow of air into the intake manifold. The engine system further includes an EGR system having an EGR valve for regulating the flow of exhaust gas into the intake manifold. A MAP, EXMP and intake aircharge temperature sensor provide signals for the corresponding regions of the engine system. The engine system is controlled by an engine control unit including a microprocessor programmed to generate an EGR flow value as a function of MAP, EXMP, the temperature of the exhaust gas flowing through the EGR, and the EGR valve position. The microprocessor is further programmed to generate a compressor airflow value as a function of the EGR flow value, intake aircharge temperature value, and dynamic estimator state; and control the EGR valve as a function of the compressor airflow value.

Other objects and advantages of the invention will become apparent upon reading the following detailed description and appended claims, and upon reference to the accompanying drawings.

BRIEF DESCRIPTION OF THE DRAWINGS

For a more complete understanding of the invention, reference should now be had to the embodiments illustrated in greater detail in the accompanying drawings and described below by way of examples of the invention. In the drawings.

DESCRIPTION OF THE PREFERRED EMBODIMENT

Figure 1:
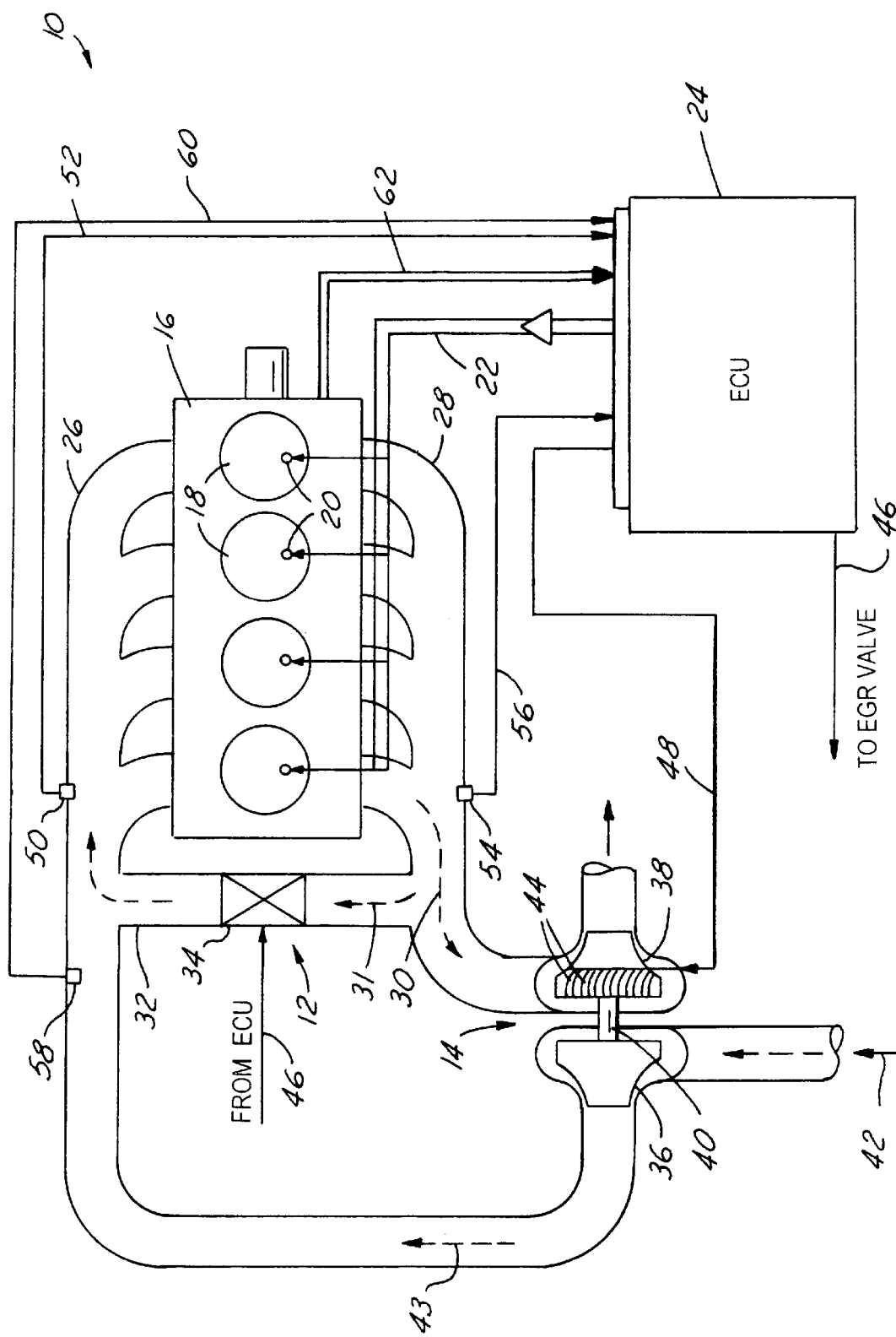
FIG. 1 is a schematic view of a compression ignition engine system having an EGR system and a VGT in accordance with one embodiment of the present invention.

Turning first to FIG. 1, there is shown a simplified schematic diagram of a compression ignition engine system 10 equipped with an exhaust gas recirculation (EGR) system 12 and a variable geometry turbocharger (VGT) 14. A representative engine block 16 is shown having four combustion chambers 18. Each of the combustion chambers 18 includes a direct-injection fuel injector 20. The duty cycle of the fuel injectors 20 is determined by the engine control unit (ECU) 24 and transmitted along signal line 22. Air enters the combustion chambers 18 through the intake manifold 26, and combustion gases are exhausted through the exhaust manifold 28 in the direction of arrow 30.

To reduce the level of NOx emissions, the engine is equipped with an EGR system 12. The EGR system 12 comprises a conduit 32 connecting the exhaust manifold 28 to the intake manifold 26. This allows a portion of the exhaust gases to be circulated from the exhaust manifold 28 to the inake manifold 26 in the direction of arrow 31. An EGR valve 34 regulates the amount of exhaust gas recirculated from the exhaust manifold 28. In the combustion chambers, the recirculated exhaust gas acts as an inert gas, thus lowering the flame and in-cylinder gas temperature and decreasing the formation of NOx. On the other hand, the recirculated exhaust gas displaces fresh air and reduces the air-to-fuel ratio of the in-cylinder mixture.

The turbocharger 14 uses exhaust gas energy to increase the mass of the aircharge delivered to the engine combustion chambers 18. The exhaust gas flowing in the direction of arrow 30 drives the turbocharger 14. This larger mass of air can be burned with a larger quantity of fuel, resulting in more torque and power as compared to naturally aspirated, non-turbocharged engines.

The turbocharger 14 consists of a compressor 36 and a turbine 38 coupled by a common shaft 40. The exhaust gas 30 drives the turbine 38 which drives the compressor 36 which, in turn, compresses ambient air 42 and directs it (arrow 43) into the intake manifold 26. The VGT 14 can be modified as a function of engine speed during engine operation by varying the turbine flow area and the angle at which the exhaust gas 30 is directed at the turbine blades. This is accomplished by changing the angle of the inlet guide vanes 44 on the turbine 38. The optimal position for the engine guide vanes 44 is determined from the desired engine operating characteristics at various engine speeds.

As can be appreciated from FIG. 1, both the EGR 12 and the VGT 14 regulate gas flow from the exhaust manifold 28. The effect of the EGR and VGT is, therefore, jointly dependent upon the conditions in the exhaust manifold 28.

All of the engine systems, including the EGR 12 and VGT 14, are controlled by the ECU. For example, signal 46 from the ECU 24 regulates the EGR valve position, and signal 48 regulates the position of the VGT guide vanes 44.

In the ECU 24, the command signals 46, 48 to the EGR 12 and VGT 14 actuators are calculated from measured variables and engine operating parameters by means of a control algorithm. Sensors and calibratable lookup tables provide the ECU 24 with engine operating information. For example, MAP sensor 50 provides a signal 52 to the ECU 24 indicative of the pressure in the intake manifold 26. Likewise, EXMP sensor 54 provides an EXMP signal 56 to the ECU 24 indicative of the pressure in the exhaust manifold 28. Further, an aircharge temperature sensor 58 provides a signal 60 to the ECU 24 indicative of the temperature of the intake aircharge 42. Additional sensory inputs can also be received by the ECU along signal line 62 such as engine coolant temperature, engine speed, and throttle position. Based on the sensory inputs and engine mapping data stored in memory, the ECU controls the EGR to regulate the intake airflow (MAF), and controls the VGT to regulate the intake manifold pressure (MAP). Because the system 10 does not include a MAF sensor, however, MAP and EXMP are used to control the EGR.

Figure 2:
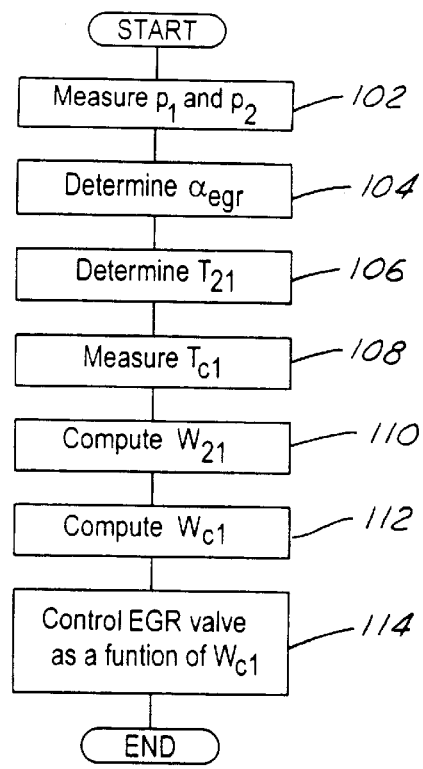
FIG. 2 is a logic diagram describing a method of estimating MAF in accordance with one embodiment of the present invention.

FIG. 2 describes the logic flow of the ECU to estimate the intake airflow and control the EGR valve.

Throughout the specification, the following notations are used in describing measured or calculated variables:

p pressure (kPa)
T temperature (K)
m mass (kg)
W mass flow (kg/s)
F burnt gas fraction
$\alpha_{egr}$ EGR valve position Furthermore, the following subscripts are used to denote regions of the engine system:

1 intake manifold 26
2 exhaust manifold 28
e engineblock 16
t turbine 38
c compressor 36

Finally, the following thermodynamic constants are referenced for air at 300 K:

$c_p$=1.0144 kJ/kg/K  $R=c_p-c_v$ $c_v$=0.7274 kJ/kg/K  $\gamma=c_p/c_v$

Hence, the symbol $p_1$, for example, refers to the intake manifold pressure in kPa. Combined subscripts, such as "e2", refer to flows from the first to the second subsystem.

As mentioned above, it is desirable to control the EGR based on the mass airflow into the intake manifold. Typically, this is accomplished by monitoring the output of a MAF sensor located in upstream from the compressor. In the present invention, however, the intake mass airflow is estimated as a function of several measured and calculated variables. FIG. 2 describes the logic routine to accomplish EGR control based on an estimate of intake mass airflow. This logic routine resides in the ECU and is executed as part of the foreground logic routine used to control the engine operating characteristics.

In step 102, measurements of intake manifold pressure ($p_1$) and exhaust manifold pressure (P2) are received by the ECU 24 by way of signal inputs 52 and 56, respectively. These signals can be filtered to remove oscillations in the signals.

Similarly, at step 104 the EGR valve position ($\alpha_{egr}$) is determined. At step 106, the temperature across the EGR system ($T_{21}$) is determined from a steady-state map based on engine operating conditions. Alternatively, $T_{21}$ can be assumed to be a constant. The air charge temperature ($T_{c1}$) can also be measured by a temperature sensor such as sensor 58 of FIG. 1, or estimated based on engine operating conditions.

Step 110 calculates the EGR flow value as a function of $p_1$, $p_2$, $T_{21}$, and $\alpha_{egr}$ according to the following equation:

$$W_{21} = f_1(\alpha_{egr}) p_2/(RT_{21})^{1/2} \phi(p_1/p_2) \qquad (1)$$

In equation (1), $f_1(\alpha_{egr})$ represents the effective flow area of the EGR valve as a function of the position of the EGR valve, R represents the difference between the pressure specific heat constant and volume specific heat constant, and $\phi$ represents a standard orifice equation having the following form:

$$\phi(r) = [(2\gamma/(\gamma-1))(r^{2/\gamma} - r^{(\gamma+1)/\gamma})]^{+e, fra\ 1/2} + ee \text{ for } r \geq (2/(\gamma+1))^{\gamma/(\gamma-1)}$$

$$\phi(r) = \gamma^{1/2}(2/(\gamma+1))^{(\gamma+1)/(2(\gamma-1))} \text{ for } r < (2/(\gamma+1))^{\gamma/(\gamma-1)}$$

With knowledge of the EGR flow value, $W_{21}$, the compressor flow rate $W_{c1}$ can be calculated in step 112 from the following differential equation describing the intake manifold pressure:

$$dp_1/dt = (R\gamma/V_1)(W_{c1}T_{c1} + W_{21}T_{21} - W_{1e}T_1) \qquad (2)$$

where the flow out of the intake manifold into the combustion chambers is given by:

$$W_{1e} = (NV_d n_{vol}/RT_1 120) p_1 \qquad (3)$$

wherein N represents the engine speed, $V_d$ represents the displacement volume of the engine, and $n_{vol}$ represents the volumetric efficiency of the engine. The volumetric efficiency is stored in the ECU memory as a function of one or more of the following variables: intake manifold pressure, intake manifold temperature, fuel rate, engine speed, and engine coolant temperature.

Hence, equation (2) can be rewritten as follows:

$$dp_1/dt = -Ap_1 + (R\gamma/V_1)(W_{c1}T_{c1} + W_{21}T_{21}) \qquad (4)$$

where $$A = (NV_d \gamma n_{vol}/V_1 120) \qquad (5)$$

Thus, from equation (5), the only unknown term is the compressor flow rate $W_{c1}$. An observer is, therefore, constructed to dynamically estimate the product $W_{c1}T_{c1}$ by interpreting the scaled enthalpy flow as the state of a dynamic system whose dynamics are assumed to be zero. In steady state, this is true; during transient conditions, however, the system dynamics could be approximated by a term proportional to the first derivative of the accelerator pedal position, requested fuel signal, or VGT actuator signal. Assume the state of the estimator is the scaled enthalpy flow, $z = W_{c1}T_{c1}$, and letting $\underline{p_1}$ and $\underline{z}$ be estimates of intake manifold pressure and z, respectively, a pressure error term and flow error term can be defined as follows:

$$e_p = p_1 - \underline{p_1}$$

$$e_z = z - \underline{z} + ee$$

The following differential equations are then observers for manifold pressure and enthalpy flow:

$$d + e, uns\ \underline{p_1}/dt = -(A+MA)\underline{p_1} + MAp_1 + (R\gamma/V_1)(W_{21}T_{21} + \underline{z}) \qquad (6)$$

$$d\underline{z}/dt = L(p_1 - \underline{p_1}) \qquad (7)$$

where L and M are calibratable constants whose value is >0. The error dynamics for equations (6) and (7) are then:

$$de_p/dt = -(1+M)Ae_p + (R\gamma/V_1)(e_z) \qquad (8)$$

$$de_z/dt = -Le_p \qquad (9)$$

From the eigenvalues of this linear system, appropriate values for the design parameters M and L can be determined; a requirement being that the eigenvalues of the error system are in the left half of the complex plane. For example, assuming M=0.5, L=0.5, and $V_1$=0.003 m³, and the engine operating conditions yielding $n_{vol}$=0.85, the eigenvalues are given by −7.3353 and −4.5647.

The estimate of the compressor airflow value ($W_{c1}$) is then given by the following equation:

$$W_{c1} = \underline{z}/T_{c1} \qquad (10)$$

In order to implement equation (10) in the digital ECU, it can be discretized with a sufficiently small sampling period $\delta t$. In such a case, the value of $W_{c1}$ is governed by the following equations:

$$\underline{p_1}(k+1) = \underline{p_1}(k) + \delta t[-(A+MA)\underline{p_1}(k) + MAp_1(k) + (R\gamma/V_1) \ldots (W_{21}(k)T_{21}(k) + \underline{z}(k))] \qquad (11)$$

$$\underline{z}(k+1) = \underline{z}(k) + \delta[L(p_1(k) - \underline{p_1}(k))] \qquad (12)$$

$$W_{c1}(k) = \underline{z}(k)/T_{c1}(k) \qquad (13)$$

Alternatively, the compressor airflow value can be defined on the basis of the ideal gas law—instead of the first law of thermodynamics as in equations (4) and (13)—as follows:

$$\underline{p_1}(k+1) = \underline{p_1}(k) + \delta t[-(A/\gamma)(A+M'A)\underline{p_1}(k) + \ldots (M'A/\gamma)p_1(k) + (RT_1(k)/V_1)(\underline{W}_{21}(k)T_{21}(k) + \underline{z}(k))] \qquad (14)$$

$$\underline{z}(k+1) = \underline{z}(k) + \delta t[L'(p_1(k) - \underline{p_1}(k))] \qquad (15)$$

$$W_{c1}(k) = \underline{z}(k) \qquad (16)$$

where M' and L' may be different from M and L.

With the compressor airflow estimate from equation (13) or (16), the ECU controls the EGR valve in step 114 in any known manner substituting the typical MAF sensor measurement by the value calculated for $W_{c1}$ in equation (13) or (16).

In accordance with another embodiment of the invention, $W_{c1}$ can be calculated by another method based on the first law of thermodynamics wherein the following equation defines the intake manifold pressure:

$$dp_1/dt = (R\gamma/V_1)(W_{c1}T_{c1} + W_{21}T_{21} - W_{1e}T_1) \qquad (17)$$

Applying a Laplace transform to both sides of equation (17) and multiplying equation (17) by 1/(TS+1) results in the following equation:

$$sp_1/(\tau s+1) = (R\gamma/V_1)(1/(\tau s+1))(W_{c1}T_{c1} + W_{21}T_{21} - W_{1e}T_1) \qquad (18)$$

From equation (18) estimates for the time rate of change of the intake pressure and compressor flow rate can be defined as follows:

$$\underline{dp_1}/dt = sp_1/(\tau s+1) \qquad (19)$$

$$\underline{W}_{c1} = W_{c1}/(\tau s+1) \qquad (20)$$

$$\underline{f} = (1/(\tau s+1))(W_{21}T_{21} - W_{1e}T_1) \qquad (21)$$

Substituting these values in equation (18), the filtered intake mass airflow, $\underline{W}_{c1}$ is defined as:

$$\underline{W}_{c1} = (1/T_{c1})((V_1/\gamma R)(d\underline{p}_1/dt - \underline{f})) \quad (22)$$

Intake pressure, $P_1$, and intake aircharge temperature, $T_{c1}$, are measured values from MAP sensor 50 and temperature sensor 58 of FIG. 1. The remaining variables are either known or can be resolved. For example, the EGR mass flow, $W_{21}$, is obtained from the standard orifice equation, using measured exhaust manifold pressure, intake manifold pressure, and the EGR valve position as in equation (1). Similarly, the engine intake flow rate, $W_{1e}$, is obtained from the mapped volumetric efficiency, measured intake manifold pressure, and engine speed as in equation (3). Also, the temperature across the EGR system, $T_{21}$, can be taken as a constant, or mapped as a function of measured engine operating conditions. Finally, the intake manifold temperature, $T_1$, is obtained from the steady state equation:

$$T_{1-(+e,uns)} W_{c1} + ee \ T_{c1} + W_{21}T_{21})/(\underline{W}_{c1} + W_{21}) \quad (23)$$

Preferably, to implement the control logic in the digital ECU, the logic can be sampled over discrete time periods, $\delta t$, resulting in the following controller equations:

$$d(k+1) = d(k) + \delta t(-\tau d(k) + p(k)) \quad (24)$$

$$d\underline{p}(k)/dt = \tau(p_1(k) - \tau d(k)) \quad (25)$$

$$\underline{f}(k+1) = \underline{f}(k) + \delta t(-\tau \underline{f}(k) + \tau(W_{21}(k)T_{21}(k) - W_{1e}(k)T_1(k))) \quad (26)$$

$$\underline{W}_{c1}(k) = (1/T_{c1}(k))((V_1/\gamma R)(d\underline{p}(k)/dt - \underline{f}(k))) \quad (27)$$

wherein $V_1$ represents the volume of the intake manifold, $d\underline{p}(k)/dt$ represents an estimate of the time rate of change of the intake manifold pressure, $\underline{f}(k)$ represents the filtered difference between the exhaust gas recirculation flow enthalpy and engine intake flow enthalpy, and $T_{c1}(k)$ represents the air charge temperature delivered by the compressor into the intake manifold.

As a further embodiment, the compressor airflow value can be defined on the basis of the ideal gas law, instead of the first law of thermodynamics as in equations (17), (26), and (27) as follows:

$$d(k+1) = d(k) + \delta t(-\tau d(k) + p(k)) \quad (28)$$

$$d\underline{p}(k)/dt = \tau(p_1(k) - \tau d(k)) \quad (29)$$

$$\underline{f}(k+1) = \underline{f}(k) + \delta t(-\tau \underline{f}(k) + \tau(W_{21}(k) - W_{1e}(k))) \quad (30)$$

$$\underline{W}_{c1}(k) = (V_1/RT_1(k))(d\underline{p}(k)/dt - \underline{f}(k)) \quad (31)$$

wherein $V_1$ represents the volume of the intake manifold, $T_1(k)$ represents the temperature of the intake manifold, $d\underline{p}(k)/dt$ represents an estimate of the time rate of change of the intake manifold pressure, and $\underline{f}(k)$ represents the filtered difference between the exhaust gas recirculation flow rate and engine intake flow rate.

Figure 3:
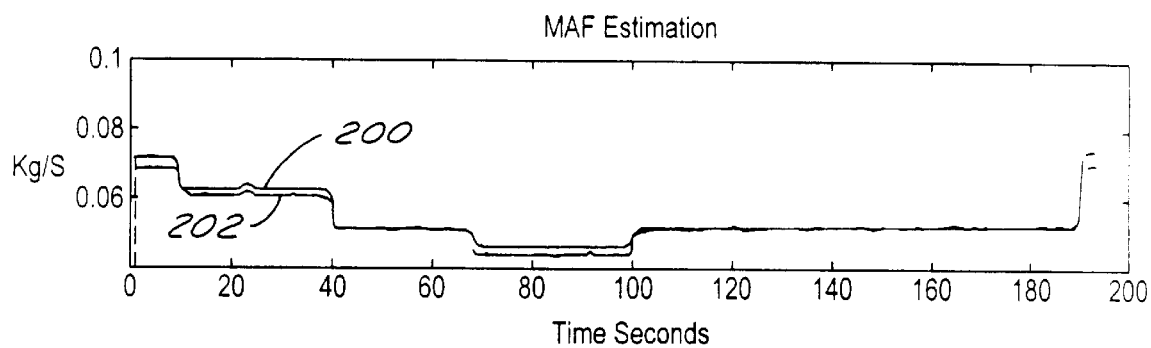
FIG. 3 is a graphical representation of one embodiment of the estimation method versus the actual MAF.

The performance of the compressor flow rate method as defined by equation (31) is illustrated in FIG. 3. FIG. 3 shows a graph of estimated MAF using equation (31) (line 202) versus the measured MAF (line 200) over a period of 200 seconds.

From the foregoing, it will be seen that there has been brought to the art a new and improved method of estimating intake mass airflow, $W_{c1}$, which eliminates the necessity for a MAF sensor. At least four methods of estimating $W_{c1}$ have been provided in equations (13), (16), (27) and (31). The control scheme of equations (11)–(13) and (14)–(16) are observer-based and incorporate two tuning parameters (M and L or M' and L', respectively) which can be used to optimize engine performance during transient conditions. The control schemes of equations (24)–(27) and (28)–(31) are filter-based, with tuning accomplished by adjusting the bandwidth parameter of the filter, $\tau$. The control schemes further differ on the basis of the underlying assumptions regarding the processes in the intake manifold. Specifically, adiabatic for equations (11)–(13) and (24)–(27) and isothermic for equations (14)–(16) and (28)–(31). The adiabatic assumption results in higher transient accuracy, provided the temperature measurements or estimates are accurate. If the temperature measurements or estimates contain large errors, the control scheme based on the isothermic assumptions proves more accurate.

While the invention has been described in connection with one or more embodiments, it will be understood that the invention is not limited to those embodiments. For example, although the engine system described includes a variable geometry turbocharger, the disclosed method would equally apply to engine systems with fixed geometry turbochargers. Accordingly, the invention covers all alternatives, modifications, and equivalents, as may be included within the spirit and scope of the appended claims.

What is claimed is:

1. A method of calculating the airflow into a compressor of a turbocharged compression ignition engine having an exhaust gas recirculation system having a valve connecting an intake manifold and exhaust manifold of the engine, the method comprising the steps of:

generating an intake pressure value ($p_1$) which is indicative of the intake manifold pressure;

generating an exhaust pressure value ($p_2$) which is indicative of the exhaust manifold pressure;

determining a first value ($\alpha_{egr}$) indicative of the position of the exhaust gas recirculation valve;

determining a first temperature value ($T_{21}$) indicative of the temperature of the exhaust gas flowing through the exhaust gas recirculation system;

determining a second temperature value ($T_{c1}$) indicative of the temperature of the aircharge entering the intake manifold of the engine;

generating an exhaust gas recirculation flow value ($W_{21}$) as a function of $p_1$, $p_2$, $T_{21}$, and $\alpha_{egr}$; and generating a compressor airflow value ($W_{c1}$) as a function of said exhaust gas recirculation flow value ($W_{21}$) and said second temperature value ($T_{c1}$), said compressor airflow value being used to control the position of said exhaust gas recirculation valve.

2. The method as set forth in claim 1 wherein the step of determining a first temperature value ($T_{21}$) includes the step of retrieving said first temperature value from a table of values indexed by engine speed.

3. The method as set forth in claim 1 wherein the step of determining a first temperature value ($T_{21}$) includes the step of retrieving said first temperature value from a table of values indexed by engine speed, fueling rate and fuel injection timing.

4. The method as set forth in claim 1 wherein the step of generating an exhaust gas recirculation flow value ($W_{21}$) is governed by the following equation:

$$W_{21} = f_1(\alpha_{egr}) p_2/(RT_{21})^{1/2} \phi(p_1/p_2)$$

wherein $f_1(\alpha_{egr})$ represents the effective flow area of the exhaust gas recirculation valve as a function of the position of the exhaust gas recirculation valve, R represents the difference between the pressure specific heat constant and volume specific heat constant, $T_{21}$ represents an estimate of the exhaust gas recirculation temperature entering the intake manifold, and φ represents a standard orifice equation having the following form:

$$\phi(r)=[(2\gamma/(\gamma-1))(r^{2/\gamma}-r^{(\gamma+1)/\gamma})]^{1/2} \text{ for } r \geq (2/(\gamma+1))^{\gamma/(\gamma-1)}$$

$$\phi(r)=\gamma^{1/2}(2/(\gamma+1))^{(\gamma+1)/(2(\gamma-1))} \text{ for } r<(2/(\gamma+1))^{\gamma/(\gamma-1)}$$

wherein γ represents the ratio of the pressure specific heat constant to volume specific heat constant.

5. The method as set forth in claim 4 wherein the step of generating a compressor airflow value ($W_{c1}$) is governed by the following equation:

$$W_{c1}=\underline{z}/T_{c1}$$

wherein $\underline{z}$ represents the scaled enthalpy flow estimate.

6. The method as set forth in claim 4 wherein the step of generating a compressor airflow value ($W_{c1}$) includes the step of calculating $W_{c1}$ over discrete sampling periods δt, the value of $W_{c1}$ being governed by the following equation:

$$W_{c1}(k)=\underline{z}(k)/T_{c1}(k)$$

wherein $\underline{z}$ represents the scaled enthalpy flow estimate derived from an adiabatic assumption of the engine system and the first law of thermodynamics.

7. The method as set forth in claim 4 wherein the step of generating a compressor airflow value ($W_{c1}$) includes the step of calculating $W_{c1}$ over discrete sampling periods δt, the value of $W_{c1}$ being governed by the following equation:

$$W_{c1}(k)=\underline{z}(k)$$

wherein $\underline{z}$ represents the flow estimate derived from an isothermal assumption of the engine system and the ideal gas law.

8. The method as set forth in claim 4 wherein the step of generating a compressor airflow value ($W_{c1}$) includes the step of calculating $W_{c1}$ over discrete sampling periods δt, the value of $W_{c1}$ being governed by the following equation:

$$W_{c1}(k)=(1/T_{c1}(k))((V_1/\gamma R)(d\underline{p}(k)/dt-\underline{f}(k)))$$

wherein $V_1$ represents the volume of the intake manifold, d$\underline{p}$(k)/dt represents an estimate of the time rate of change of the intake manifold pressure, $\underline{f}$(k) represents the filtered difference between the exhaust gas recirculation flow enthalpy and engine intake flow enthalpy, and $T_{c1}$(k) represents the air charge temperature delivered by the compressor into the intake manifold.

9. The method as set forth in claim 4 wherein the step of generating a compressor airflow value ($W_{c1}$) includes the step of calculating $W_{c1}$ over discrete sampling periods δt, the value of $W_{c1}$ being governed by the following equation:

$$W_{c1}(k)=(V_1/RT_1(k))(d\underline{p}(k)/dt-\underline{f}(k))$$

wherein $V_1$ represents the volume of the intake manifold, $T_1$(k) represents the temperature of the intake manifold, d$\underline{p}$(k)/dt represents an estimate of the time rate of change of the intake manifold pressure, and $\underline{f}$(k) represents the filtered difference between the exhaust gas recirculation flow rate and engine intake flow rate.

10. In a compression ignition engine including a variable geometry turbocharger having a compressor and turbine, and an exhaust gas recirculation passage having an exhaust gas recirculation valve connecting an intake manifold and exhaust manifold of the engine, said exhaust gas recirculation valve regulating the rate at which exhaust gas is recirculated into the intake manifold, a method of calculating the airflow from the compressor into the intake manifold comprising the steps of:

generating an exhaust gas recirculation flow value ($W_{21}$) as a function of the intake manifold pressure ($p_1$), the exhaust manifold pressure ($p_2$), the temperature of the exhaust gas flowing through the exhaust gas recirculation system ($T_{21}$), and the position of the exhaust gas recirculation valve ($\alpha_{egr}$); and generating a compressor airflow value ($w_{c1}$) as a function of said exhaust gas recirculation flow value ($W_{21}$) and the intake aircharge temperature value ($T_{c1}$), said compressor airflow value being used to control the position of the exhaust gas recirculation valve.

11. The method as set forth in claim 10 wherein the step of generating an exhaust gas recirculation flow value ($W_{21}$) is governed by the following equation:

$$W_{21}=f_1(\alpha_{egr})p_2/(RT_{21})^{1/2}\phi(p_1/p_2)$$

wherein $f_1(\alpha_{egr})$ represents the effective flow area of the exhaust gas recirculation valve as a function of the position of the exhaust gas recirculation valve, R represents the difference between the pressure specific heat constant and volume specific heat constant, $T_{21}$ represents an estimate of the exhaust gas recirculation temperature entering the intake manifold, and φ represents a standard orifice equation having the following form:

$$\phi(r)=[(2\gamma/(\gamma-1))(r^{2/\gamma}-r^{(\gamma+1)/\gamma})]^{+e,fra\ 1/2}+ee \text{ for } r\geq(2/(\gamma+1))^{\gamma/(\gamma-1)}$$

$$\phi(r)=\gamma^{1/2}(2/(\gamma+1))^{(\gamma+1)/(2(\gamma-1))} \text{ for } r<(2/(\gamma+1))^{\gamma/(\gamma-1)}$$

wherein γ represents the ratio of the pressure specific heat constant to volume specific heat constant.

12. A compression ignition engine system comprising:

an engine block having a plurality of combustion chambers formed therein for combusting an air/fuel mixture;

an intake manifold for delivering intake air to the combustion chambers;

an exhaust manifold for transmitting exhaust gas from the combustion chambers;

a variable geometry turbocharger having a compressor coupled to a turbine, the turbine being in communication with the exhaust gas in the exhaust manifold and the compressor being in communication with the intake manifold such that exhaust gas drives the turbine which causes the compressor to increase the flow of ambient air into the intake manifold;

an exhaust gas recirculation conduit having an exhaust gas recirculation valve connecting the exhaust manifold and intake manifold of the engine, responsive to an exhaust gas recirculation signal, for regulating the rate at which exhaust gas is recirculated into the intake manifold;

a first manifold pressure sensor in the intake manifold for providing an intake manifold pressure signal ($p_1$);

a second manifold pressure sensor in the exhaust manifold for providing an exhaust manifold pressure signal ($p_2$);

a temperature sensor between the compressor and the intake manifold for providing an intake aircharge temperature signal ($T_{c1}$); and an engine control unit for generating said exhaust gas recirculation signal comprising:

a microprocessor programmed to:

generate an exhaust gas recirculation flow value ($W_{21}$) as a function of the intake manifold pressure ($p_1$), the exhaust manifold pressure ($p_2$), the temperature of the exhaust gas flowing through the exhaust gas recirculation system ($T_{21}$) and the position of the exhaust gas recirculation valve ($\alpha_{egr}$);

generate an estimate of compressor airflow value ($W_{c1}$) as a function of said exhaust gas recirculation flow value ($W_{21}$) and the intake aircharge temperature value ($T_{c1}$);

generate said exhaust gas recirculation signal as a function of $W_{c1}$; and transmit said exhaust gas recirculation signal to said exhaust gas recirculation valve.

13. The compression ignition engine system of claim 12 wherein the microprocessor generates an exhaust gas recirculation flow value ($W_{21}$) by:

receiving the intake pressure value ($p_1$) and exhaust pressure value ($p_2$);

retrieving a first value ($\alpha_{egr}$) indicative of the position of the exhaust gas recirculation valve;

retrieving a first temperature value ($T_{21}$) from a table of values indexed by engine speed; and calculating $W_{21}$ according to the following equation:

$$W_{21} = f_1(\alpha_{egr}) p_2 / (RT_{21})^{1/2} \phi(p_1/p_2)$$

wherein $f_1(\alpha_{egr})$ represents the effective flow area of the exhaust gas recirculation valve as a function of the position of the exhaust gas recirculation valve, R represents the difference between the pressure specific heat constant and volume specific heat constant, $T_{21}$ represents an estimate of the exhaust gas recirculation temperature entering the intake manifold, and $\phi$ represents a standard orifice equation having the following form:

$$\phi(r) = [(2\gamma/(\gamma-1))(r^{2/\gamma} - r^{(\gamma+1)/\gamma}]^{+e,fra\ 1/2} + ee \text{ for } r \geq (2/(\gamma+1))^{\gamma/(\gamma-1)}$$

$$\phi(r) = \gamma^{1/2}(2/(\gamma+1))^{(\gamma+1)/(2(\gamma-1))} \text{ for } r < (2/(\gamma+1))^{\gamma/(\gamma-1)}$$

wherein $\gamma$ represents the ratio of the pressure specific heat constant to volume specific heat constant.

14. The compression ignition engine system of claim 13 wherein the microprocessor generates the compressor airflow value ($W_{c1}$) over discrete sampling periods $\delta t$, and the value of $W_{c1}$ is governed by the following equation:

$$W_{c1}(k) = \underline{z}(k)/T_{c1}(k)$$

wherein $\underline{z}$ represents the scaled enthalpy flow estimate derived from an adiabatic assumption of the engine system and the first law of thermodynamics.

15. The compression ignition engine system of claim 13 wherein the microprocessor generates the compressor airflow value ($W_{c1}$) over discrete sampling periods $\delta t$, and the value of $W_{c1}$ is governed by the following equation:

$$W_{c1}(k) = \underline{z}(k)$$

wherein $\underline{z}$ represents the flow estimate derived from an isothermal assumption of the engine system and the ideal gas law.

16. The compression ignition engine system of claim 13 wherein the microprocessor generates the compressor airflow value ($W_{c1}$) over discrete sampling periods t, and the value of $W_{c1}$ is governed by the following equation:

$$W_{c1}(k) = (1/T_{c1}(k))((V_1/\gamma R)(d\underline{p}(k)/dt - \underline{f}(k)))$$

wherein $V_1$ represents the volume of the intake manifold, $d\underline{p}(k)/dt$ represents an estimate of the time rate of change of the intake manifold pressure, $\underline{f}(k)$ represents the filtered difference between the exhaust gas recirculation flow enthalpy and engine intake flow enthalpy, and $T_{c1}$ represents the air charge temperature delivered by the compressor into the intake manifold.

17. The compression ignition engine system of claim 13 wherein the microprocessor generates the compressor airflow value ($W_{c1}$) over discrete sampling periods $\gamma t$, and the value of $W_{c1}$ is governed by the following equation:

$$W_{c1}(k) = (V_1/RT_1(k))(d\underline{p}(k)/dt - \underline{f}(k))$$

wherein $V_1$ represents the volume of the intake manifold, $T_1$ represents the temperature of the intake manifold, $d\underline{p}(k)/dt$ represents an estimate of the time rate of change of the intake manifold pressure, and $\underline{f}(k)$ represents the filtered difference between the exhaust gas recirculation flow rate and engine intake flow rate.

\* \* \* \* \*